United States Patent [19]

Beranek et al.

[11] Patent Number: 5,493,393
[45] Date of Patent: Feb. 20, 1996

[54] PLANAR WAVEGUIDE SPECTROGRAPH

[75] Inventors: Mark W. Beranek, Bellevue; Barbara A. Capron, Issaquah; Raymond W. Huggins, Mercer Island; David M. Griffith; Darrell L. Livezy, both of Renton; Timothy Traynor, Redmond, all of Wash.

[73] Assignee: The Boeing Company, Seattle, Wash.

[21] Appl. No.: 75,597

[22] PCT Filed: Dec. 18, 1991

[86] PCT No.: PCT/US91/09634

§ 371 Date: Oct. 12, 1993

§ 102(e) Date: Oct. 12, 1993

[87] PCT Pub. No.: WO92/11517

PCT Pub. Date: Jul. 9, 1992

Related U.S. Application Data

[63] Continuation-in-part of Ser. No. 631,898, Dec. 21, 1990, abandoned, which is a continuation-in-part of Ser. No. 325,249, Mar. 17, 1989, Pat. No. 4,999,489.

[51] Int. Cl.$^6$ .................................. G01J 3/20; G01J 3/36
[52] U.S. Cl. .................................... 356/328; 356/334
[58] Field of Search ................................ 356/328, 334

[56] References Cited

U.S. PATENT DOCUMENTS

| | | | |
|---|---|---|---|
| 3,151,247 | 9/1964 | Auvermann | 250/226 |
| 3,222,978 | 12/1965 | Dreyfus . | |
| 3,532,429 | 10/1970 | Hughes et al. . | |
| 3,822,098 | 7/1974 | Rudder et al. . | |
| 3,973,850 | 8/1976 | Pouey . | |
| 4,030,828 | 6/1977 | Sonobe et al. . | |
| 4,111,524 | 9/1978 | Tomlinson, III . | |
| 4,198,117 | 4/1980 | Kobayashi . | |
| 4,223,216 | 9/1980 | Quick et al. | 250/226 |
| 4,334,152 | 6/1982 | Dakin et al. | 250/226 |

(List continued on next page.)

FOREIGN PATENT DOCUMENTS

| | | |
|---|---|---|
| 2680012 | 2/1993 | France . |
| 263820 | 1/1989 | Germany ........................ 356/328 |
| 55-6320 | 1/1980 | Japan . |
| 56-119822 | 9/1981 | Japan . |
| 59-85918 | 5/1984 | Japan . |
| 63-315922 | 12/1988 | Japan . |

OTHER PUBLICATIONS

American Holograph Quality Diffraction Optics, "Concave Diffraction Gratings, Solutions to Spectroscopic Problems, Desginers Handbook and Catalog," 11 p.

Dianov et al., "Spectral channel demultiplexer utilizing a planar multimode waveguide," *Sov. J. Quantum Electron.*, 11(2), Feb. 1981, pp. 229–230.

(List continued on next page.)

*Primary Examiner*—Vincent P. McGraw
*Attorney, Agent, or Firm*—Christensen, O'Connor, Johnson & Kindness

[57] ABSTRACT

A spectrograph usable as a demultiplexer/detector in a wavelength division multiplexing optical system. The spectrograph comprises a planar waveguide and a detector array. The planar waveguide has a dispersive edge having an inwardly concave shape, an input edge, and a straight output edge. The dispersive edge has a reflective diffraction grating formed on it, the grating having a variable line spacing. An optical input signal comprising a plurality of different wavelength ranges enters the waveguide at the input edge, and travels through the waveguide and strikes the grating. The grating focuses the optical energy in each of the wavelength ranges at a focal spot at the output edge, the position of each focal spot being a function of wavelength. The detector array comprises a plurality of photodetectors positioned along a straight line, such that the photodetectors are positioned at the focal spots. Each photodetector therefore detects the optical energy in one of the input ranges. A stack of such planar waveguides may be assembled to form a multichannel spectrograph.

15 Claims, 7 Drawing Sheets

U.S. PATENT DOCUMENTS

| | | |
|---|---|---|
| 4,335,933 | 6/1982 | Palmer . |
| 4,367,040 | 1/1983 | Goto .......................................... 356/44 |
| 4,546,466 | 10/1985 | Lopiccolo .................................... 370/3 |
| 4,643,519 | 2/1987 | Bussard et al. . |
| 4,652,080 | 3/1987 | Carter et al. . |
| 4,740,688 | 4/1988 | Edwards ................................... 250/226 |
| 4,784,935 | 11/1988 | Ehrfeld et al. ........................... 430/321 |
| 4,815,849 | 3/1989 | Sullivan .................................... 356/328 |
| 4,816,672 | 3/1989 | Hughes ............................. 250/231 SE |
| 4,999,489 | 3/1991 | Huggins .................................... 250/226 |

OTHER PUBLICATIONS

Fritsch et al., "Wavelength–division multiplexed digital optical position transducer," *Optics Letters*, 11(1, Jan. 1986, pp. 1–3.

Lang, NASA Brief, "Integrated Grating Spectrometer, An entire spectrometer would be fabricated on a silicon wafer," NASA's Jet Propulsion laboratory, Pasadena, Calif., Sep. 1990, p. 802.

Lerner et al., "Direct reading spectrometer optimization using two complementary concave holographic gratins," *SPIE*, vol. 503, Application, Theory, and Fabrication of Periodic Structures (1984), pp. 53–58.

Lewis, "Fiber optic sensors offer advantges for aircraft," *SPIE Optical Engineering Reports*, Jun. 1987, 2 pp.

Noda et al., "Design of holographic concave gratings for Seya–namioka monochromators," *Journal of the Optical Society of America*, vol. 64, No. 8, Aug. 1974, pp. 1043–1048.

Noda et al., "Geometric theory of the grating," *Journal of the Optical Society of America*, vol. 64, No. 8, Aug. 1974, pp. 1031–1036.

Pavlycheva, "Optical Design, Design of flat–field spectrograph employing a holographic grating," *Sov. J. Opt. Technol.*, 46(7), Jul. 1979, pp. 394–396.

Rowland, "On Concave Gratings for Optical Purposes," *Phil. Magazine*, Series 5, vol. 16, No. 99, Sep. 1883, pp. 197–211.

Suhara et al., "Integrated–optic wavelength multi– and demultiplexers using a chirped grating and an ion–exchanged wqveguide," *Applied Optics*, vol. 21, No. 12, Jun. 15, 1982, pp. 2195–2198.

Touzet et al., "Design of new Holographic Gratings for a High S/N Ratio Flat Field Spectrograph," Reprint from the Proceedings, *SPIE*, vol. 655, Optical System Design, Analysis, and Production for Advanced Technology Systems, 1986, pp. 409–415 plus cover sheet.

Yen et al., "Planar Rowland spectrometer for fiber–optic wqvelength demultiplexing," *Optics Letters*, vol. 6, No. 12, Dec. 1981, pp. 639–641.

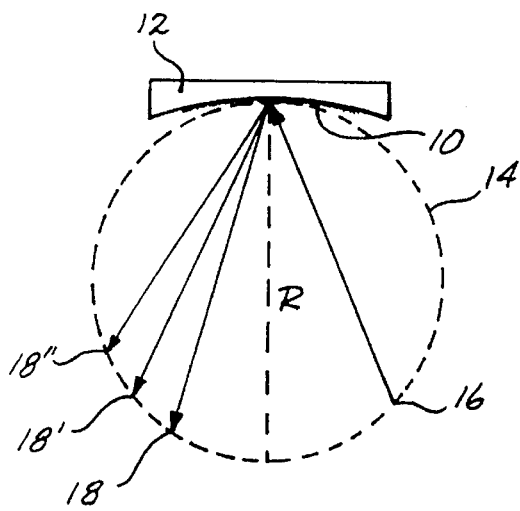
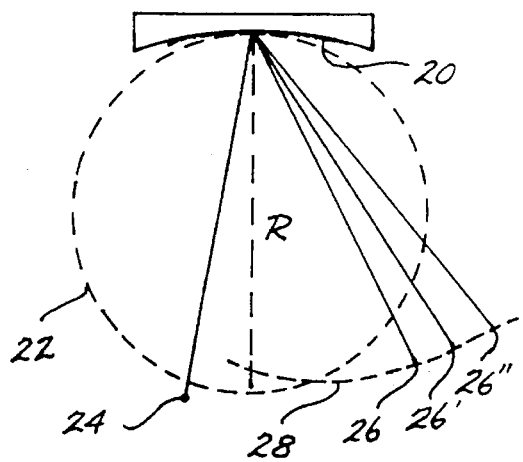
Fig. 1A.  Fig. 1B.
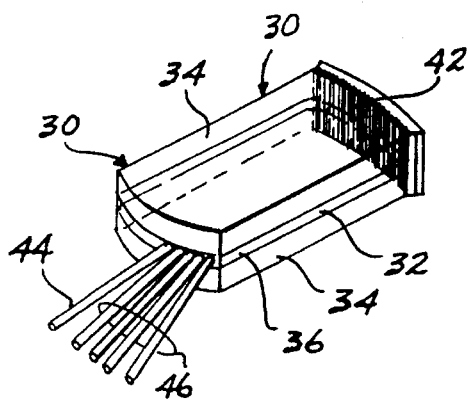
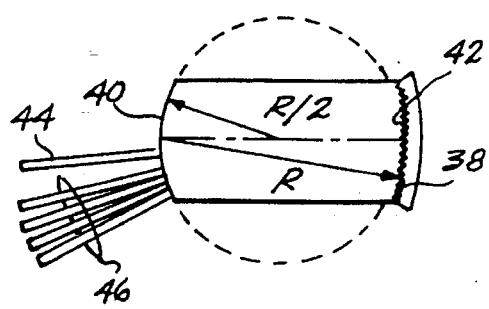
Fig. 2.
PRIOR ART
Fig. 3.
PRIOR ART
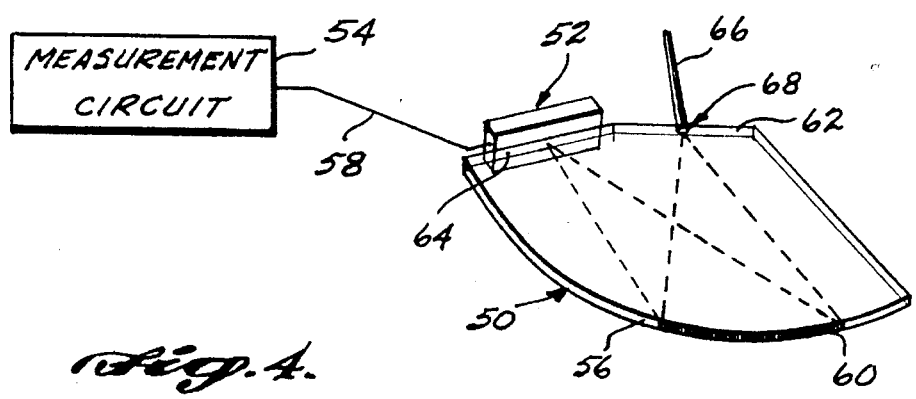
Fig. 4.

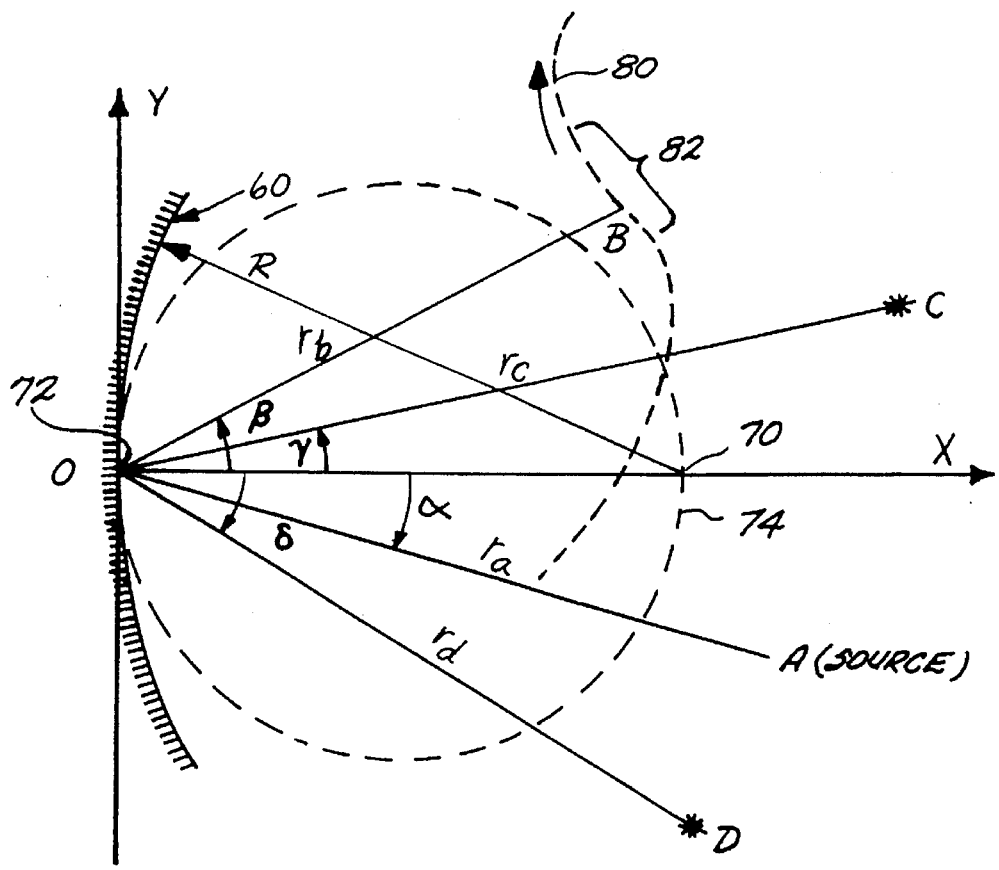
_fig. 5._
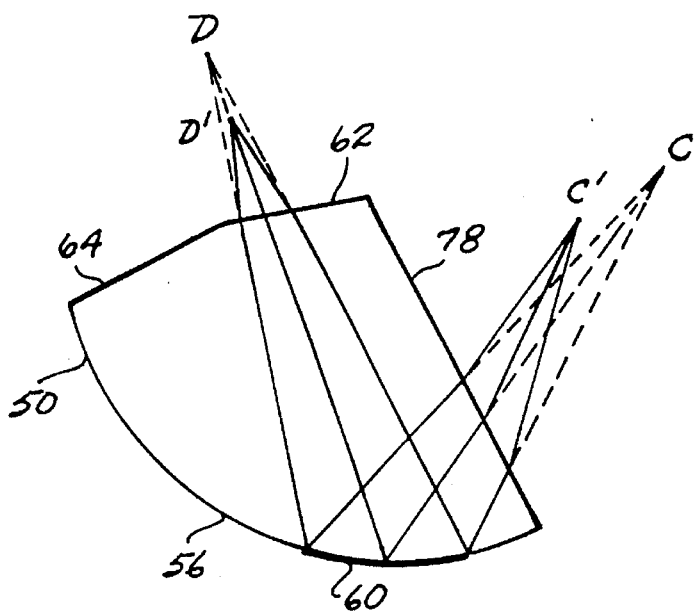
_fig. 6._

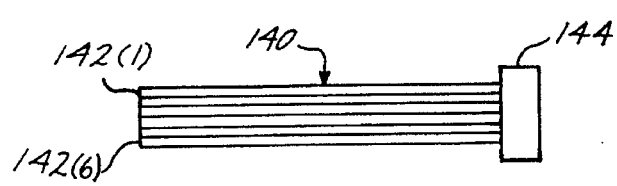
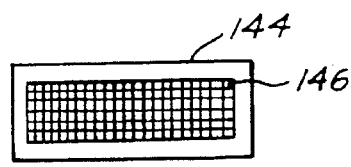
Fig. 13.  Fig. 14.
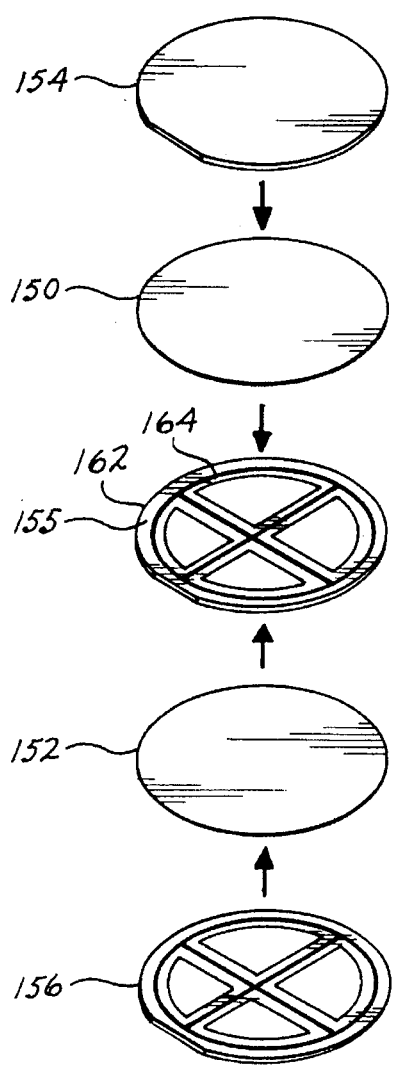
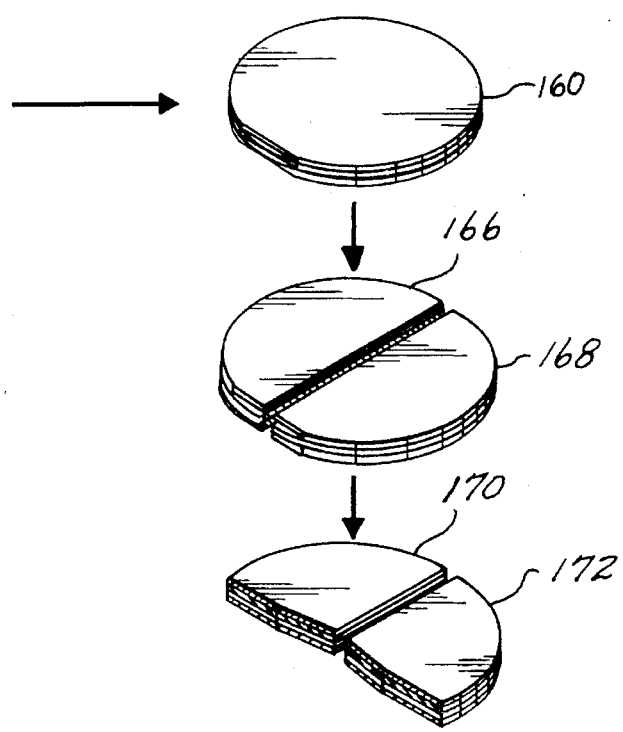
Fig. 15.

PLANAR WAVEGUIDE SPECTROGRAPH

CROSS REFERENCE TO RELATED APPLICATIONS

This application is a continuation-in-part of application Ser. No. 631,898, abandoned, filed Dec. 21, 1990, entitled PLANAR WAVEGUIDE SPECTROGRAPH, which is a continuation-in-part of application Ser. No. 325,249, filed Mar. 17, 1989, now U.S. Pat. 4,999,489.

FIELD OF THE INVENTION

The present invention relates to spectrographs and, in particular, to a compact spectrograph that uses a planar waveguide. The spectrograph of the invention has particular utility in wavelength division multiplexed optical sensing systems.

BACKGROUND OF THE INVENTION

A number of systems have been developed for multiplexing optical fibercoupled transducers. Such systems include optical time division multiplexing, coherence multiplexing, and wavelength division multiplexing (WDM). Although all three systems have been demonstrated, WDM appears to offer the most promise for near term implementation in aircraft and other complex systems. In a WDM system, discrete spectral wavelength ranges or bands propagating along a fiber bus are modulated by one or,more of the sensors or transducers. A crucial component of a WDM system is a demultiplexer/detector, capable of receiving a broadband optical signal and of detecting the optical energy in different wavelength bands.

SUMMARY OF THE INVENTION

The present invention provides a spectrograph that is well suited to serve as a demultiplexer/detector in a WDM system. The spectrograph receives an optical input signal, and detects the optical energy of the input signal in a plurality of different wavelength ranges.

In a preferred embodiment the spectrograph of the present invention comprises a planar waveguide and a detector array. The planar waveguide has a plurality of side edges extending between upper and lower faces. The side edges include a dispersive edge having an inwardly concave shape, an input edge, and a straight output edge. The dispersive edge has a reflective diffraction grating formed on it, the grating comprising a plurality of lines with a variable line spacing. The line spacing and the positions of the input and output edges are selected such that when the optical input signal is introduced into the waveguide at the input edge, the input signal travels through the waveguide and strikes the grating. The grating focuses the optical energy in each of the wavelength ranges of the input signal at a focal spot at the output edge, with the position of each focal spot being a function of wavelength.

The detector array comprises a plurality of photodetectors positioned along a straight line. The detector array is positioned such that the photodetectors are positioned at the respective focal spots, so that each photodetector (or group of adjacent photodetectors) detects the optical energy in a corresponding one of the wavelength ranges. In a preferred embodiment, the waveguide comprises a unitary sheet of material, and the grating comprises grooves formed on the dispersive edge. The grooves may be formed mechanically, by mechanical replication, or by selectively etching the dispersive edge using radiation from a pair of coherent illumination points.

In a second preferred embodiment, a plurality of waveguides of the type described above are stacked one upon the other to form a multi-channel spectrograph. The multi-channel spectrograph receives a plurality of optical input signals, and detects the optical energy of each input signal in a plurality of different wavelength ranges. The output edges are preferably positioned in a plane, so that the stack of waveguides can be directly interfaced to a two-dimensional detector array such as a CCD array. Adjacent waveguides may be isolated from one another by plates, or by thin films deposited on the upper and lower waveguide surfaces, to maintain total internal reflection. Total internal reflection may also be maintained by lowering the refractive index of the waveguide near its surfaces, for example, by ion-diffusion.

BRIEF DESCRIPTION OF THE DRAWINGS

FIGS. 1A and 1B schematically illustrate the operation of Rowland spectrometers;

FIG. 2 illustrates a prior art demultiplexer using a slab waveguide;

FIG. 3 is a second schematic view of the demultiplexer of FIG. 2;

FIG. 4 is a perspective drawing of the spectrograph of the present invention;

FIG. 5 is a graph illustrating the geometry of the spectrograph of FIG. 4;

FIG. 6 illustrates a first preferred method for optically forming the grating;

FIG. 13 illustrates a multi-channel spectrograph embodiment of the invention;

FIG. 14 illustrates the detector array of the embodiment of FIG. 13; and

FIG. 15 illustrates the assembly process for a two channel spectrograph.

DETAILED DESCRIPTION OF THE PREFERRED EMBODIMENT

Figure 7:
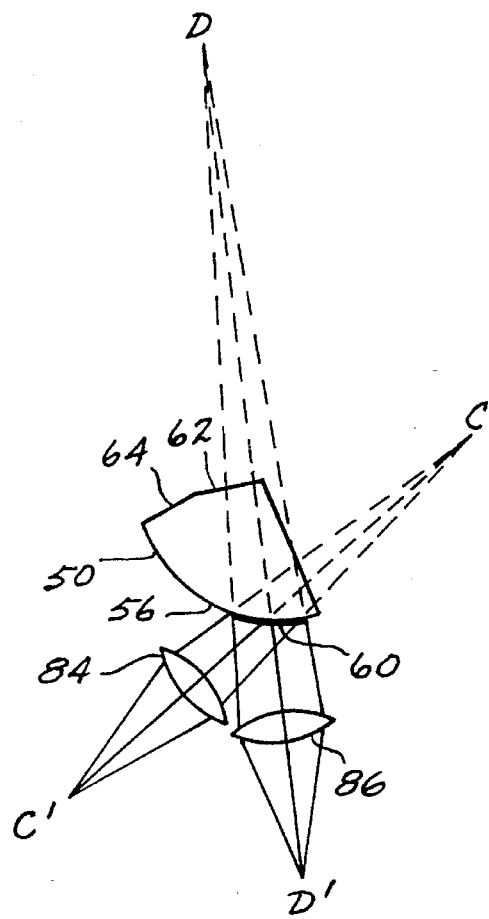
FIG. 7 illustrates a second preferred method for optically forming the grating.

The spectrograph of the present invention is derived from the classical Rowland spectrometer that is schematically illustrated in FIG. 1A. The Rowland spectrometer makes use of a concave, reflective diffraction grating 10 as a dispersion element. Grating 10 is formed on substrate 12, and has a concave spherical shape, with a radius of curvature equal to R. The grating comprises lines that are equally spaced from one another along a chord of the concave grating.

For such a concave grating, there is an associated Rowland circle 14 that has a radius of R/2 and that is tangent to the midpoint of the grating. The significance of the Rowland circle is that if a monochromatic point source 16 is positioned on the Rowland circle, then grating 10 will produce a focused image 18 of source 16 at another position on the Rowland circle. The position of image 18 is a function of the wavelength of the light. Thus, if source 16 comprises three different spectral ranges or bands, then three focused images 18, 18', and 18" will be produced on the Rowland circle. If source 16 is a broadband source, then a continuous spectrum will be imaged on the Rowland circle. Examples of prior art Rowland spectrometers are shown in U.S. Pat. Nos. 3,532,429 and 4,030,828.

With the advent of high powered coherent optical sources, it has become possible to produce diffraction gratings with complex, variable line spacings, using what are loosely referred to as holographic techniques. Such techniques are described in U.S. Pat. No. 3,973,850, and in the paper by N. K. Pavlycheva, entitled "Design of Flat-Field Spectrograph Employing a Holographic Grating," 8 *Soy. J. Opt. Technol.* (*USA*) 46, 394-6 (1979).

FIG. 1B illustrates one of the principal advantages that can be obtained through the use of variable line spacings. Diffraction grating 20 has been produced holographically, and the spacing of the lines is no longer constant along a chord as in the conventional Rowland spectrometer. As a result, a point source 24 having three wavelength components will be imaged at points 26, 26', and 26", with the source and image points now no longer located on Rowland circle 22. In general, radiation emitted by source 24 will be imaged along focal line 28, at positions that depend upon the wavelengths emitted by the source. As further described below, the location of focal line 28 can be controlled by adjustment of the location of source 24 and of the variable line spacing of the grating.

In recent years, "planar" Rowland spectrometers have been developed as wavelength division multiplexers and demultiplexers for telecommunication applications, with both inputs and outputs being optical fibers. An example of a prior art demultiplexer based on a classical Rowland spectrometer is shown in FIGS. 2 and 3. The device comprises a body 30 formed by epoxying a thin cover glass 32 between two microscope slides 34, to thereby form a thin planar waveguide 36 in the cover glass layer. Body 30 has a cylindrical end face 38 having a radius of curvature R, and a cylindrical front face 40 having a radius of curvature of R/2. A diffraction grating is formed on end face 38 by wrapping a gold foil with a linear grating on it around the end face. The distance between the center points of the front and end faces is equal to R, the radius of curvature of the grating.

Input optical fiber 44, containing a signal to be demultiplexed, is butted up against waveguide 36 at front face 40. The input signal on optical fiber 44 includes a plurality of different wavelength components. Light introduced into waveguide 36 from optical fiber 44 is reflected and diffracted by grating 42, at an angle that depends upon the wavelength of the light. Output optical fibers 46 are also butted up against waveguide 36 at the same front :face 40, such that each output optical fiber receives light of a different wavelength.

The operation of the demultiplexer shown in FIGS. 2 and 3 is generally similar to that of a conventional Rowland spectrometer, except that the light path is two-dimensional and confined within the planar waveguide. Confinement of the light within the waveguide degrades the resolution to about 1% of the input wavelength for an input optical fiber having a numerical aperture of 0.2, due to multimode propagation within the waveguide. Since this :intrinsic degradation is comparable to the resolution limit due to the optical fiber diameter, small devices (e.g., 1 cm. square) are practical where fiber diameter effects will still dominate. A factor that significantly degrades the performance of the demultiplexer is the fact that the grating is linear along the circumference of the Rowland circle, and not along a chord as required by the Rowland theory.

A first preferred embodiment of the spectrograph of the present invention is illustrated in FIG. 4. The spectrograph comprises planar waveguide 50, photodetector array 52, and measurement circuit 54. Waveguide 50 comprises a thin layer of a material that is transparent at the wavelengths of interest, and includes an inwardly concave surface 56 on which diffraction grating 60 is formed. Waveguides also includes input surface 62 and straight (planar) output surface 64. Optical fiber 66 is butted up against input surface 62, while photodetector array 52 is butted up against output surface 64.

An input optical signal on optical fiber 66 enters waveguide 50 at entry point 68, spreads laterally at a rate that depends upon the numerical aperture of the optical fiber, and strikes concave diffraction grating 60. Grating 60 disperses the different wavelength ranges or components of the optical input signal, and images such components onto straight output surface 64, with the position of each component being a function of its wavelength. Photodetector array 52 comprises a linear array of individually addressable photodetectors, e.g., a CCD array. In such an array, each photodetector converts incident optical energy into a quantity of electrical charge, which charge is then convened into a voltage; signal that may be read and recorded by measurement circuit 54. The measurement circuit may thereby determine the amount of optical energy of the input signal in each wavelength range.

An important feature of the present invention is that the spectrograph focuses different wavelength component along a straight line (i.e., output surface 64). This feature permits the focused light to be directly interfaced to the photodetector array. Flat field spectrographs differ from the classical Rowland spectrometer in two respects. First, the source point is located off the Rowland circle. Second, the grating line spacing is asymmetrically varied about the center of the grating. A geometric plan view of such a spectrograph is shown in FIG. 5. Concave grating 60 is cylindrical in shape, and has a circular cross section with center of curvature 70, radius of curvature R, and center point 72. The corresponding Rowland circle of diameter R is indicated by reference numeral 74.

X and Y axes are constructed as shown, with axis X being normal to grating 60 at center point 72, and axis Y being tangential to the grating at center point 72. The location of the optical source is designated by A, and the image position (for a particular wavelength) is designated by B. Point A corresponds to entry point 68 in FIG. 4.

For a given source point location and a given line spacing for grating 60, the focused image will in general be located along a focus line 80, with the position of the image along focus line 80 being a function of wavelength. It is desired to design the line spacing of grating 60 such that focus line 80 includes a region 82 along which the focus line is substantially a straight line.

The first order equations that describe the positions of points A and B as a function of wavelength are:

$$\sin \alpha + \sin \beta = m\lambda/(\sigma\mu_g) \qquad (1)$$

$$\cos^2 \alpha/r_a + \cos^2 \beta/r_b - \frac{1}{R}(\cos \alpha + \cos \beta) = (m\lambda/\mu_g) \cdot (\mu_m H_{200}/\lambda_o) \qquad (2)$$

Equations (1) and (2) are derived from H. Noda, T. Namioka, and M. Seya, "Geometric Theory of the Grating," *J. Opt. Soc. Am.* 64, pp. 1031–1036 (1974). In these equations, A ($r_a$, $\alpha$) is the source point, B ($r_b$, $\beta$) is the image point, m is the diffraction order, $\sigma$ is the line spacing at the center of the grating, $H_{200}$ is the azimuthal focusing constant that defines the variability and degree of the line spacing variation, R is the radius of curvature of the diffraction grating (i.e., the diameter of the Rowland circle), $\lambda$ is the wavelength of the radiation, $\lambda_0$ is the wavelength of the light used to cream the grating (further described below), $\mu_g$ is the refractive index of waveguide 50, and $\mu_m$ is a refractive index that is further described below. In Equations (1) and (2), the astigmatic focus conditions have been ignored, because of the planar geometry.

In FIG. 5, focus line 80 indicates the position of image point B as a function of wavelength $\lambda$ for a given source position A and for selected values of $\sigma$ and $H_{200}$. Combinations of these parameters can be found for which focus line 80 approximates a straight line over a desired wavelength range. Once a particular design has been selected, the parameters $\sigma$ and $H_{200}$ may be determined by Equations (1) and (2).

In general, grating 60 may be created either optically or mechanically by replication. In an optical process, a thin uniform layer of photoresist is deposited on the curved edge of the waveguide on which the diffraction grating is to be formed, for example, on curved edge 56 of waveguide 50 shown in FIG. 4. The photoresist is then exposed to coherent light from two slits or pin holes positioned precisely at a pair of illumination points. These points are indicated by the letters C and D in FIG. 5. The values for the parameters $\sigma$ and $H_{200}$ are used to fix the locations of the two coherent illumination points C ($r_c$, $\gamma$) and D ($r_d$, $\delta$) according to the following equations, which again are derived from Noda et al.:

$$\sin\gamma - \sin\delta = \lambda_o/(\mu_m\sigma) \qquad (3)$$

$$\cos^2\gamma/r_c - \cos^2\delta/r_3 - 1/R(\cos\gamma - \cos\delta) = H_{200} \qquad (4)$$

$\mu_m$ is the refractive index of the medium through which the light from sources C and D will pass during exposure of the photoresist. This medium may either be waveguide 50 or air, as further described below. Equations (3) and (4) indicate that there are infinite number of pairs of positions for the two sources. Preferably, the source positions are chosen to minimize the spectral line width by setting the coma-like third order aberration term to zero. The positions of sources C and D that minimize coma and hence line width are then selected.

A spectrograph of the type described above was produced, and was found to perform exceptionally well as an optical demultiplexer. The specifications of the spectrograph were as follows:

| | |
|---|---|
| $\sigma$ | 1500 lines per millimeter |
| $\mu_g$ | 1.51 |
| R | 1.0 (normalized) |
| $r_a$ | 1.08 (normalized) |
| $\alpha$ | 12° |
| $H_{200}$ | 0.305 |
| $\lambda_o$ | 488 nanometers |

The thickness of the planar waveguide was 0.05 inches. The spectrograph operated over wavelength range of 700–900 nanometers, and had a focal field length along output edge 64 of 8 millimeters.

FIGS. 6 and 7 illustrate two methods for positioning sources C' and D' for creating grating 60 on an edge of waveguide 50. In the method shown in FIG. 6, slits are located at illumination positions C' and D', and diverging radiation from the slits passes through waveguide 50, and falls on a portion of curved edge 56 to form grating 60. Radiation from source C' enters waveguide 50 via lateral edge 78, while radiation from point D' enters waveguide 50 through input surface 62. In the assembled spectrograph, source point A will be located along input surface 62, while image point B will be located along output surface 64, as indicated in FIG. 4. Since it is impossible to locate the illumination points within waveguide 50, the light rays pass first through air and then through waveguide 50 in reaching surface 56. Such light is therefore refracted at the air/waveguide interface, and such refraction must be taken into account. Illumination points C' and D' appear to be located at points C and D which would apply if the waveguide was extended away from curved edge 56.

A second and generally more convenient method for creating the grating is illustrated in FIG. 7. In this arrangement, slits are located at illumination points C' and D', and the radiation from such points is converted to converging radiation by lenses 84 and 86, respectively. The illumination points C' and D' and lenses 84 and 86 are selected such that the radiation striking edge 56 appears to be coming from virtual sources C and D. Virtual sources C and D are then positioned as in the arrangement of FIG. 6.

Interferometrically controlled ruling engines now permit ruled master diffraction gratings to be fabricated with variable groove spacing. The ruling engine is computer controlled, and the groove spacing is typically specified by a polynomial or an analytical expression. After a spectrograph has been designed and developed using the holographic method described above, it may be desirable to transfer the design to a ruled master, so that spectrographs can be mass produced by replication rather than by individual holographic exposure. The efficiency is enhanced by putting a blaze on the grating.

An analytic expression for the line frequency f (lines per millimeter) projected onto a chord as a function of the locations of the two illumination positions C and D is as follows:

$$f = \frac{1}{\lambda}\left[\frac{\frac{w}{R}\frac{x_d - z}{\sqrt{1 - w^2/R^2}} + (y_d - w)}{\sqrt{(x_d - z)^2 + (y_d - w)^2}} - \frac{\frac{w}{R}\frac{x_c - z}{\sqrt{1 - w^2/R^2}} + (y_c - w)}{\sqrt{(x_c - z)^2 + (y_c - w)^2}}\right] \qquad (5)$$

For this equation, the X and Y axes are located as in FIG. 5, w is the distance along the chord parallel to the Y axis, and $z=R-R[1-w^2/R^2]^{1/2}$. It has been determined that the blaze angle for maximum efficiency is equal to $(\alpha+\beta)/2$ where $\alpha$ is the source angle, and $\beta$ is the diffraction angle for the wavelength at the middle of the range that is imaged onto the linear portion of focal curve 80 (FIG. 5). Replica gratings formed in gold coated epoxy reflecting layers have been produced, and have identical focusing properties to the original holographically-produced spectrograph.

Figure 8:
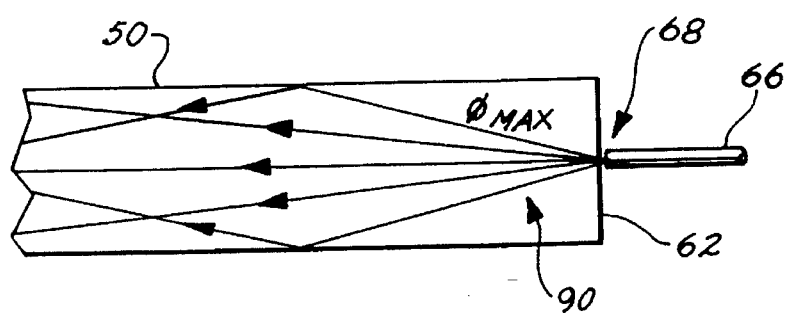
FIG. 8 is a schematic cross-sectional view showing multimode propagation within a waveguide.

In FIG. 5, for a monochromatic source A, the width (along line 82) of the focused and diffracted image B is affected by multimode light propagation within planar waveguide 50. Referring to FIG. 8, light rays entering waveguide 50 from optical fiber 66 form a cone 90 of light. Inside the waveguide, the rays therefore have a propagation component in the direction parallel to the diffraction grating rulings, i.e., normal to the plane of the waveguide. Following the derivation of the general form of the grating equation described in G. W. Stroke, "Diffraction Gratings," *Encyclopedia of Physics*, Vol. XXIX Optical Instruments, Ed. S. Flugge, published by Springer-Verlag, pp. 426, 754 (1967), the diffraction equation for rays propagating within the waveguide may be determined to be $$\sin r = \left(\frac{m\lambda}{d} - \sin i\right)\left(1 + \frac{2m\lambda}{d} \cdot \frac{\sin i(1-\cos\phi)}{\left(\frac{m\lambda}{d} - \sin i\right)^2}\right)^{1/2} \quad (6)$$

In equation 6, i and r are the angles of incidence and reflection at the grating surface in the plane of the waveguide. d is the local grating spacing, m is the diffraction order, and $\phi$ is the angle between the ray and the plane of the waveguide. As $\phi$ increases for a constant value of $\lambda$, the diffraction angle increases. Since the cone of rays 90 emerging from the optical fiber into the waveguide has a distribution of $\phi$ values up to $\phi_{max}$, asymmetric broadening of the diffracted image towards longer wavelengths occurs. A typical line shape for a monochromatic source is shown by curve 94 in FIG. 9. It can be seen that curve 94 includes a long wavelength tail 96. The line width at the 10% point is 4.5 times greater than that which would result from broadening due to the width of the optical fiber source alone. The discontinuous nature of the graph in FIG. 9 results from the finite pixel size of the detector array.

Figure 9:
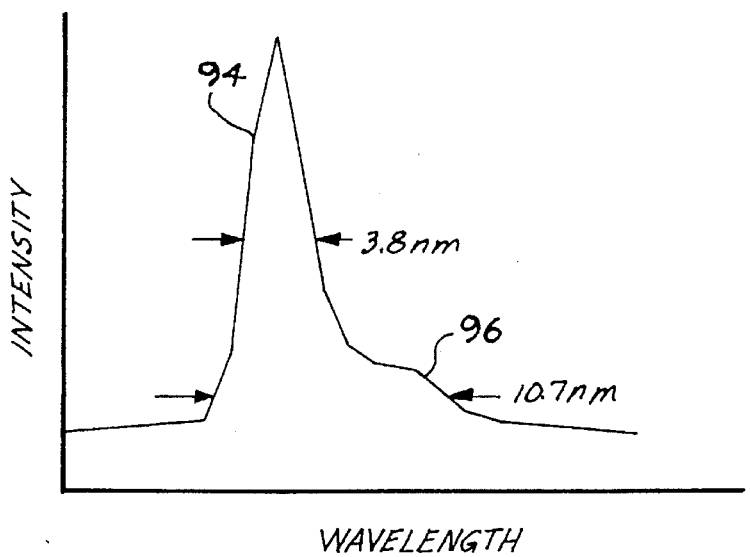
FIG. 9 is a graph showing the line shape produced by a monochromatic input.
Figure 10C:
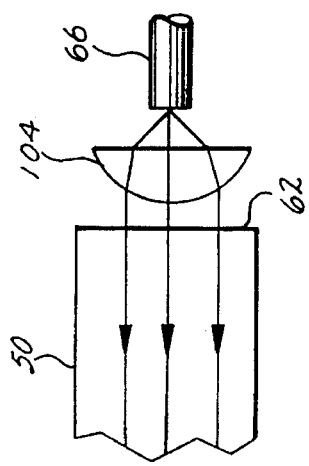
FIGS. 10a–10c illustrate the use of separate cylindrical lenses to collimate the input light.
Figure 10B:
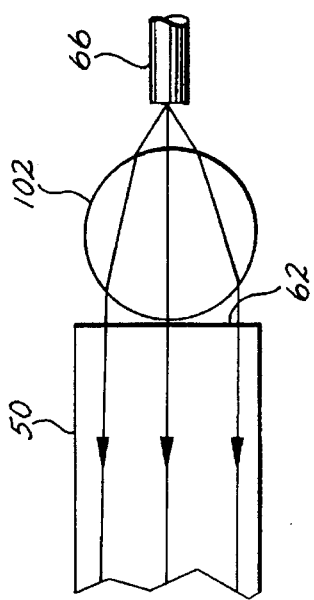
Figure 10A:
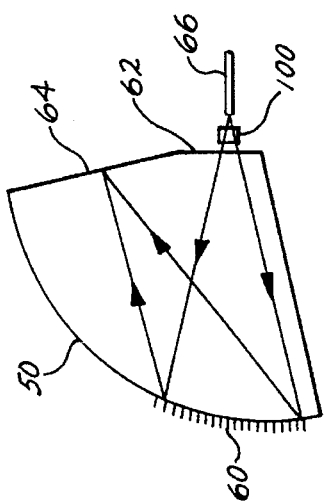

The line broadening illustrated in FIG. 9 may be minimized by reducing the angle $\phi_{max}$ shown in FIG. 8. In principle, this could be achieved by reducing the numerical aperture of the optical fiber. However, for many applications, this would lead to reduced light being coupled into the waveguide, and would therefore be counterproductive. In accordance with the invention, the line broadening is minimized by collimating the light emerging from the optical fiber in the plane normal to the plane of the waveguide. In a first preferred embodiment, such collimation is achieved as shown in FIG. 10a, by placing cylindrical lens 100 between optical fiber 66 and input surface 62 of waveguide 50. The cylindrical lens may comprise a cylindrical rod lens 102 as shown in cross section in FIG. 10b, or a plano-convex cylindrical lens 104 as shown in cross section in FIG. 10c. In either case, the rays emerging from optical fiber 66 are substantially collimated along the direction normal to the waveguide, thereby reducing the angle $\phi_{max}$ and minimizing line broadening.

Figure 11C:
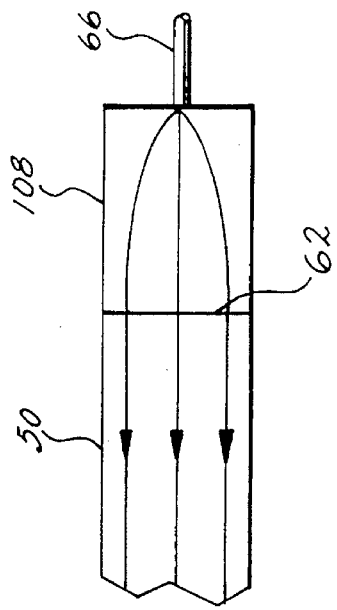
FIG. 11c illustrates the use of a slab lens integral with the edge of the waveguide.
Figure 11B:
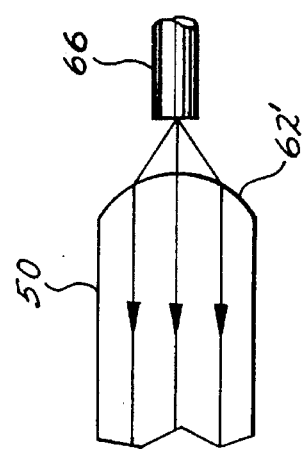
FIGS. 11a–11b illustrate the use of cylindrical lens features directly attached to the edge of the waveguide.
Figure 11A:
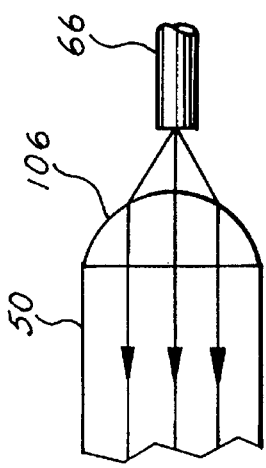

Three further preferred methods for collimating the input light are illustrated in FIGS. 11a–11c. In FIG. 11a, cylindrical lens 106 is directly attached to waveguide 50, for example using an optical cement. This arrangement has the advantage of compactness and of easier alignment. FIG. 11b shows a variation, in which input surface 62' of waveguide 50 is shaped so as to form a cylindrical lens that is integral with the waveguide. Finally, in FIG. 11c, graded index slab lens 108 may be attached directly to input surface 62 of waveguide 50, with optical fiber 66 being butted up directly against the graded index lens. Suitable graded index slab lenses are available from Hoya Optics Inc.

Figure 12:
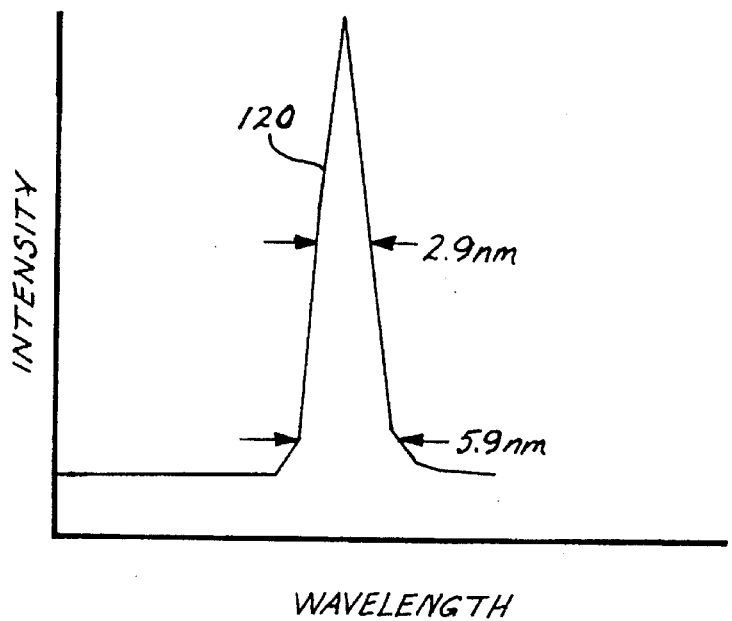
FIG. 12 illustrates the line shape with input collimation.

The advantage produced by collimating the input light may be seen by comparing FIG. 9 (discussed above) with FIG. 12. FIG. 12 illustrates the spectral line 120 obtained at the same wavelength as FIG. 9, by collimating the input beam using a cylindrical lens as in FIG. 10a. Collimation reduces the width at half maximum from 3.8 nanometers to 2.9 nanometers, and reduces the 10% line width from 10.7 nanometers to 5.9 nanometers. Line 120 can be seen to be nearly symmetrical, whereas line 94 obtained using an uncollimated beam includes a very distinct long wavelength tail 96. The narrow line width obtained using collimated input beams means that the channel spacing that can be obtained is about half that which can be obtained using uncollimated input.

The planar waveguide profile of the spectrograph of the present invention permits a plurality of spectrographs to be stacked in a highly compact fashion. For example, FIG. 13 illustrates a side view of a stack 140 of six planar waveguides 142(1)–142(6). Waveguides 142 are positioned such that their output surfaces lie in a plane, so that the waveguide output surfaces can be directly interfaced to a two-dimensional photodetector array 144. In this configuration, the six spectrographs do not occupy significantly greater space than a single spectrograph. As shown in FIG. 14, the face of array 144 contains a rectangular, planar array of individual photodetectors 146, arranged in six rows. Array 144 may be a two-dimensional CCD array, such as those used in television cameras. In one arrangement, each row of the array receives light from only one spectrograph, while each column of the array receives light of a particular wavelength. Alternatively, each spectrograph may illuminate one or more rows of photodetectors.

In one preferred approach, after fabrication of the stack 140, a single diffraction grating is formed extending across the entire thickness of the stack, such that an identical grating is created on each waveguide, and such that the gratings on the different waveguides have their grooves aligned with one another. In an alternate approach, different gratings are first formed on the individual waveguides, and the waveguides are then assembled into a stack. In this second approach, the mapping of wavelengths to the photodetectors in a row can be varied from one channel to another, for increased versatility.

It is important that rays propagating in one waveguide do not significantly leak into the adjacent waveguides. This means that all the rays propagating within each waveguide should be totally internally reflected, and that the evanescent tails of the higher order modes propagating within a given waveguide should not leak into an adjacent waveguide or into any spacer material used. This may be accomplished in a number of ways.

In a preferred embodiment, a relatively lower refractive index material is deposited in the form of a thin (e.g., two micron) film on the upper and lower surfaces of each waveguide. A preferred film material is amorphous silica, which forms a robust thin film via ion-assisted electron beam evaporation or sputtering. Silica also has an extremely low optical absorption in the near infrared, so radiation loss of such light propagating in the film is negligible. For the case in which the waveguide is fabricated from BK-7 glass with a refractive index of 1.52, the refractive index of amorphous silica (1.46) is sufficiently lower to provide the required confinement, and to produce a relatively high numerical aperture of about 0.38, to provide efficient coupling of light from the optical fiber.

In general, amorphous silica will not function optimally if heating is required, and other techniques for providing isolation between the waveguides should be used for such cases. Such techniques include, the use of a lower refractive index polymeric coating and/or a lower refractive index spacer material. An example of a lower refractive index polymeric coating is poly(methyl-methacrylate) with a refractive index of 1.49. An example of a lower refractive index spacer material is fused quartz (refractive index of 1.46). A thin region of lower refractive index may also be created by ion-diffusion in the waveguide surface. For some cases, the use of a spacer having a rough (i.e., non-optically flat) surface will provide enough of a gap to obviate the light leakage problem.

A preferred technique for fabrication of a two-channel spectrograph in accordance with the present invention is outlined in FIG. 15. The process begins with a pair of waveguides 150, 152. Each waveguide may comprise a disk of BK-7 glass, 0.015 inches thick, with two micron thick films of amorphous silica on each of its sides. Waveguides 150 and 152 are formed into a stack 160 using plates 154–156. A suitable material for the plates is a ceramic material available from Corning under the trademark MACOR. Each plate surface to which a waveguide will be joined includes a pattern of grooves 162 in which solder glass 164, or another suitable adhesive, is deposited. The use of grooves provides precise separation of the waveguides, to ensure effective registration of an array of input optical fibers to the waveguides. The adhesive may optionally be deposited directly onto the surfaces of waveguides 150 and 152, respectively.

The illustrated layers are then formed into stack 160 in a suitable jig, and heated and/or pressed to cause the adhesive to flow, to join the waveguides and plates in place into a precisely spaced and rigid stack. A preferred adhesive material is Ferro 1160HZ solder glass, because it has a coefficient of thermal expansion and optical finishing characteristics that closely match BK-7 glass and MACOR ceramic. Other suitable adhesives include inorganic alumina and zirconlure based ceramic adhesives such as a Cottonics 903HP, polymer based adhesives (e.g., silicones, alkaloids and epoxies), and metallic alloys such as low melting indium based solders.

Once stack 160 has been formed, its perimeter is subjected to conventional optical finishing and polishing, and the stack is then divided into a pair of spectrograph blanks 166 and 168. The blanks are then further cut and polished to form spectrograph bodies 170 and 172. A diffraction grating is then formed on each body, using either holographic, replication, or ion milling techniques. For each body, the diffraction grating is preferably formed in a single step, such that identical gratings are formed on the two waveguides contained within the body. This assures accurate registration of the gratings with one another. Forming and finishing of the waveguide edges after assembly of the waveguides into a sandwich structure provides precise end face coplanarity, and enables radial alignment of the gratings.

While the preferred embodiments of the invention have been described, variations will be apparent to those skilled in the art. Accordingly, the scope of the invention is to be determined by reference to the following claims.

The embodiments of the invention in which an exclusive property or privilege is claimed are defined as follows:

1. A multi-channel spectrograph for receiving a plurality of optical input signals, and for detecting the optical energy of each input signal in a range of wavelengths, the spectrograph comprising:

a plurality of planar waveguides, each waveguide having a plurality of side edges extending between upper and lower faces, the side edges of each planar waveguide including a curved edge having an inwardly concave shape, an input edge, and a straight output edge, the curved edge including a dispersive portion having a reflective diffraction grating formed thereon, the grating comprising a plurality of lines and having a variable line spacing, the line spacing and the positions of the input and output edges being selected such that when one of the optical input signals is introduced into the waveguide at the input edge, the input signal travels through the waveguide and strikes the grating, and the grating focuses the optical energy in the input signal at a focal spot at the output edge, the waveguides being stacked parallel to one another such that their output edges are positioned in a plane and said dispersive portion of the curved edge is fabricated integrally on the plurality of planar waveguides after they are stacked; and a detector array comprising a two-dimensional array of photodetectors positioned along a plurality of adjacent and parallel straight lines, the array being positioned such that the photodetectors of each line are positioned at the respective focal spots of one of the waveguides, such that the optical energy detected by each photodetector corresponds to the optical energy in a corresponding portion of the range of wavelengths of one of the input signals.

2. The spectrograph of claim 1, wherein each waveguide comprises a unitary sheet of material, and wherein each grating comprises grooves formed in the dispersive portion of the curved edge.

3. The spectrograph of claim 2, wherein all gratings have the same line spacing.

4. The spectrograph of claim 2, wherein the upper and lower face of each waveguide includes a thin layer of amorphous silica.

5. The spectrograph of claim 2, wherein the upper and lower face of each waveguide includes a thin layer of a relatively low refractive index polymeric coating.

6. The spectrograph of claim 2, wherein the upper and lower face of each waveguide includes an ion diffusion region.

7. The spectrograph of claim 2, wherein the multi-channel spectrograph further comprises plates positioned between the waveguides.

8. The spectrograph of claim 7, wherein each plate has a refractive index lower than the refractive indices of the waveguides between which it is positioned.

9. The spectrograph of claim 7, wherein each plate comprises at least one plate surface positioned adjacent to a waveguide, and wherein each plate surface comprises a pattern of shallow grooves containing an adhesive material.

10. The spectrograph of claim 7, wherein the plates are joined to the waveguides by means of an adhesive.

11. The spectrograph of claim 10, wherein the adhesive is a solder glass adhesive.

12. The spectrograph of claim 10, wherein the adhesive is a ceramic adhesive.

13. The spectrograph of claim 10, wherein the adhesive is a polymer based adhesive.

14. The spectrograph of claim 10, wherein the adhesive is a metal alloy solder.

15. The spectrograph of claim 7, wherein each plate has at least one non-optically flat surface.

* * * * *